United States Patent Office.

JAMES P. HALL, OF NEW YORK, N. Y.

Letters Patent No. 92,962, dated July 27, 1869.

IMPROVED COMPOUND FOR CUTTING AND POLISHING.

The Schedule referred to in these Letters Patent and making part of the same.

*To all whom it may concern:*

Be it known that I, JAMES P. HALL, of the city, county, and State of New York, have invented a new and improved Compound for Cutting and Polishing; and I do hereby declare that the following is a full, clear, and exact description thereof, which will enable others skilled in the art to make and use the same.

The present invention relates to a new and useful compound, combining both cutting and polishing-qualities.

The object of this compound is, to offer a good and cheap article, which will act as a substitute for emery, rotten-stone, and such other articles, which cut and do not polish, or which polish without cutting.

The invention consists in mixing a certain natural deposit, consisting of silica, protoxide and sesquioxide of iron, alumina, and magnesia, with red ochre and litharge, or red ochre, litharge, and iron-rust, the said ingredients consisting, more or less, in the following proportions:

*Natural Deposit*—Silica, protoxide of iron; sesquioxide of iron, alumina, and magnesia, the said ingredients predominating in the order above mentioned, thoroughly mixed, dry, with two parts red ochre, one part litharge, one part iron-rust. This composition may either be mixed dry, or with half-boiled linseed-oil, to the consistency of stiff putty.

Having thus described my invention,

What I claim as new, and desire to secure by Letters Patent, is—

A compound for cutting and polishing-purposes, having the within-named ingredients thoroughly mixed, substantially as herein described and set forth.

JAMES P HALL.

Witnesses:
FRANK BLOCKLEY,
ALEX. F. ROBERTS.